United States Patent [19]

Elrod et al.

[11] Patent Number: 5,676,729
[45] Date of Patent: Oct. 14, 1997

[54] PARTICULATE UREA WITH MINERAL FILLER INCORPORATED FOR HARDNESS

[75] Inventors: Jim L. Elrod, Killen, Ala.; Peter B. Aylen, Kamloops, Canada

[73] Assignee: Western Industrial Clay Products, Ltd., Kamloop, Canada

[21] Appl. No.: 496,769

[22] Filed: Jun. 29, 1995

[51] Int. Cl.⁶ .................................................. C05C 9/00
[52] U.S. Cl. ................. 71/28; 71/64.12; 71/64.13; 71/64.07; 71/64.11
[58] Field of Search ................... 71/28–30, 64.07, 71/64.11, 64.12, 64.13

[56] References Cited

U.S. PATENT DOCUMENTS

| | | | |
|---|---|---|---|
| 4,001,378 | 1/1977 | Jasnosz | 71/64.12 |
| 4,015,970 | 4/1977 | Hennart | 71/11 |
| 4,390,483 | 6/1983 | Willens et al. | 264/7 |
| 4,478,632 | 10/1984 | Van Hijfte et al. | 71/29 |
| 4,525,198 | 6/1985 | Van Hifjte et al. | 71/28 |
| 4,885,021 | 12/1989 | Elrod | 71/28 |

FOREIGN PATENT DOCUMENTS

| | | |
|---|---|---|
| 2126645 | 6/1972 | France . |
| 123994 | 1/1977 | Germany . |
| 52006649 | 2/1981 | Japan . |

*Primary Examiner*—Ferris Lander
*Attorney, Agent, or Firm*—Emrich & Dithmar

[57] ABSTRACT

A particulate urea product having improved anticaking and nonfriable properties and which is useful for either direct application to the soil or as an intermediate product for the subsequent incorporation with other fertilizer materials into solid bulk blends. The product consists of an admixture of urea and a finely divided mineral filler selected from the group consisting of diatomaceous, sodium bentonite, calcium bentonite, kaolin, zeolite and ball clay and is in either granular or prill form.

36 Claims, No Drawings

PARTICULATE UREA WITH MINERAL FILLER INCORPORATED FOR HARDNESS

TECHNICAL FIELD

This invention relates to a particulate urea product in granular or prill form having finely divided mineral filler incorporated to improve the hardness and anticaking characteristics of the product.

BACKGROUND OF THE INVENTION

In the fertilizer industry, urea has surpassed ammonium nitrate as the leading source of solid form nitrogen. There are a number of reasons for the preference for urea over ammonium nitrate. They include: (1) urea has a higher plant nutrient analysis over ammonium nitrate, (2) urea is classified as a nonhazardous material whereas ammonium nitrate, under certain conditions and in admixture with certain proportions of carbonaceous materials, may be an explosive compound, (3) in the off-season, urea has a number of end uses other than fertilizer, particularly animal feedstock and in certain chemical processing, and (4) there are lower costs for air pollution abatement requirements associated with urea production in contrast with that of ammonium nitrate. One drawback to the use of urea as a fertilizer in the form of granules or prills is that it is highly friable and prone to caking.

High friability is a significant restraint to the use of urea granular products. The prills or granules tend to break into smaller particles, and to produce substantial amounts of dust while being handled, transported, and applied to the intended soil environment. Particle hardness is important for two reasons. Firstly, urea products are often used in bulk blend fertilizer products. In those products, it is important that there be a predetermined, closely-sized range of granules to avoid unwanted segregation of the component products. If the urea product breaks into smaller particles, segregation of the urea is likely to occur. The second reason why particle hardness is important is that highly friable urea granular products break down when introduced into the modern, rotating turbine-fan type field distribution equipment commonly used today. The breakdown of the granules or prills results in uneven distribution of the fertilizer from such equipment. The urea granular products are often shattered to such a degree that the smaller pieces fall in a shorter trajectory from the equipment and thus form a more narrow and a more concentrated swath on the soil surface than is intended and desired.

The second problem with urea granular products is caking. The tendency to cake varies depending on how the urea solution is processed into urea granular products. Urea granular products are transported, sold and used in large volumes and are thus transported and stored in bulk form. Because of the tendency for the product to cake, such storage and transportation is not feasible without additional processing considerations which add significantly to the cost of production.

In recent years, commercial fertilizer distributors and farmers recognized the superior chemical properties of the urea granular product and have accordingly made heightened demands for an improvement in the hardness, i.e. non-friability, of urea particles. This greater emphasis on particle hardness arises from the fact that the modern methods of handling and transportation result in more crushing of the urea particles. In addition, those involved in the handling, transportation and distribution of the urea product are making increased demands for a nondusting product. Such demands are based in large part on health and safety considerations.

In an effort to overcome these problems, a number of approaches have been developed in the chemical fertilizer industry. These approaches are discussed in the disclosure in U.S. Pat. No. 4,885,021 (Elrod) issued Dec. 5, 1989, which is incorporated herein by reference. The first approach is to surface treat the freshly prepared urea particles with any of a number of materials including diatomaceous earth and clay. While this approach improves the anticaking characteristics of the urea product, it does not solve to any appreciable degree the friability problem. In addition, in some circumstances, the added material may incorporate foreign elements which are not compatible with the purpose for which the urea product may ultimately be used.

The second approach to solving the problems of caking and friability is to incorporate into either the concentrated urea synthesis liquor solution or the anhydrous molten urea melt, conditioning agents which impart to the urea product either improved anti-caking properties, improved hardness, or both. The caking and friability problems as well as other problems attendant in the storage, handling and distribution of the urea product have been alleviated to a significant degree by the addition to the urea melt of low concentrations of formaldehyde or lignosulfonates. While the addition of low concentrations of formaldehyde alleviates to a certain degree the problems associated with caking and friability, the use of formaldehyde presents serious health and safety considerations. While the addition of lignosulfonates imparts to the urea product satisfactory anticaking and hardening characteristics it also is fraught with certain disadvantages. In particular, lignosulfonates can discolour the urea product to an unaesthetic brownish colour, with the result that the product is not well accepted in the marketplace.

In order to overcome such disadvantages, Elrod '021 proposes the addition of a gelling type channelized 2:1 clay such as attapulgite or sepiolite to the urea melt or the urea synthesis liquor. The resulting urea particulate demonstrates good anticaking and nonfriability characteristics. The mechanism by which the gelling type channelized 2:1 clays improve the mechanical properties of the urea granular products is attributed in Elrod '021 to the crystalline geometry of the clays. It is there postulated that the clay needles of the channelized 2:1 clays, being about one micron in length offer a plethora of nucleating sites or growth sites and alter the crystalline habit or structure of the urea, thereby increasing anti-caking and non-friable properties.

While the solution taught in Elrod '021 is effective to improve the physical properties of urea granules, its commercial applicability depends in large part on the ready availability of large quantities of attapulgite, sepiolite or other gelling type channelized 2:1 clays, at low cost. Attapulgite, sepiolite and other such channelized 2:1 clays are relatively expensive additives for urea fertilizer products. Attapulgite clay is mined chiefly in the states of Georgia and Florida whereas sepiolite is mined chiefly in the states of California and Nevada. The locations of these mining areas can be geographically isolated from the production plants where the urea particulate is produced. As a result, the cost of transporting the clays to the production plants is often substantial. As vast quantities of the attapulgite and sepiolite are required to produce the large volumes of fertilizer product being demanded and used, the initial costs and the transportation costs of such additives are a significant factor in the overall cost of the fertilizer product. Depending on the proximity of the user to the production plant, shipping costs can more than double the plant of origin cost. Accordingly, there is a need for other more widely available and less expensive additives to replace the channelized 2:1 clays disclosed in Elrod '021.

SUMMARY OF THE INVENTION

The present invention relates to an improved urea particulate product useful for either direct application to the soil or as an intermediate product for the subsequent incorporation with other fertilizer materials into solid bulk blends. The product of the present invention has improved anticaking and nonfriable characteristics which render it equal or superior to urea fertilizer granules produced by incorporation into the urea synthesis liquor of attapulgite clay.

It has been discovered that the anticaking and nonfriable characteristics imparted by the addition of gelling type 2:1 channelized clays as described in Elrod '021, can also be achieved by the use of other mineral fillers. Finely divided powder forms of the mineral fillers are added to the urea in relatively small quantities with the result that the desired particulate properties are greatly enhanced. The mineral fillers suitable for use in the present invention are mined products which typically are far more widespread than attapulgite deposits, being mined in several areas across North America, and as a result can usually be delivered to the plant at a low cost compared to attapulgite. Thus, in accordance with one aspect of the present invention, there is provided a particulate urea having improved anticaking, hardness and nonfriable properties consisting of an admixture of urea and a finely divided mineral filler distributed therein, the mineral filler consisting of one or more members selected from the group comprising diatomaceous earth, sodium bentonite, calcium bentonite, zeolite and ball clay. In accordance with another aspect of the present invention, there is provided a particulate urea having improved anticaking, hardness and nonfriable properties consisting of an admixture of urea and a finely divided mineral filler distributed therein, the mineral filler being comprised of diatomaceous earth and one or more of the group of clays consisting of sodium bentonite, calcium bentonite, kaolin, zeolite and ball clay. In accordance with another aspect of the present invention, there is provided a method for producing a particulate urea having improved anticaking, hardness and nonfriable properties comprising the steps of: incorporating a finely divided mineral filler with a molten urea melt or a urea synthesis liquor, the mineral filler consisting of one or more members selected from the group comprising diatomaceous earth, sodium bentonite, calcium bentonite, kaolin, zeolite and ball clay; and transforming the melt or the liquor and the mineral filler to a particulate form. In accordance with another aspect of the present invention, there is provided a method for producing a particulate urea having improved anticaking, hardness and nonfriable properties comprising the steps of: incorporating a finely divided mineral filler with a molten urea metal or a urea synthesis liquor, the mineral filler being comprised of diatomaceous earth and one or more of the group of clays consisting of sodium bentonite, calcium bentonite, kaolin, zeolite and ball clay; and transforming the melt or the liquor and the mineral filler to particulate form.

DETAILED DESCRIPTION OF THE INVENTION

The particulate urea product of this invention is made by incorporating finely divided mineral fillers or combinations of different mineral fillers into the urea synthesis liquor, either from the synthesis section or the concentration (evaporation) section, or into the particulate forming section, i.e., the molten urea melt, during the granular urea manufacturing process. The resulting mixture is then transformed into particulate forms of urea (for example, prills, granules or pellets) by any of a number of methods presently known and practised by those skilled in the art. Only small quantities of mineral fillers are necessary to impart the desired physical properties of hardness and storage stability enabling the initial high nitrogen content of the fertilizer to be maintained. Suitable fillers are selected from the group consisting of diatomaceous earth, calcium bentonite, sodium bentonite, kaolin, zeolite and ball clay.

For purposes of determining the physical characteristics of the product of the present invention, hardness tests were carried out on sample pellets. The hardness of urea pellets directly reflects the ability of the urea to withstand both caking and storage as well as friability and fracture during handling and storage. 50 gram batches of molten urea melt at 275 to 285 degrees F were treated by adding varying amounts of the finely divided mineral particles as indicated in Table 1. The urea melt and the mineral particles were thoroughly mixed for about 2 minutes. As the mineral particles are not soluble in the urea melt, mild agitation was required to maintain homogeneous distribution of the mineral particles in each hemispherical segment of urea subsequently formed after the mixing step. The mixture was then poured into porcelain colour plates wherein it quickly solidified into hemispherical pellets about 0.3 inches thick and about 0.8 inches wide. After cooling and aging for a minimum time of 4 hours, the pellets were tested for hardness by compressing them in a compression tester to their breaking points. Prior to testing, the bases of the pellet were sanded for the purpose of smoothing or levelling the hemisphere base, thereby, assuring a single break which more accurately reflects the hardness of the treated urea. The figures in Table 1 reflect average crushing strength expressed in pounds. Untreated urea pellets were similarly produced and tested as control samples and yielded average crushing strengths of about 100 lbs.

TABLE 1

| Additive | Wt % in Urea | | | | | | | | | | |
|---|---|---|---|---|---|---|---|---|---|---|---|
| | 0.10 | 0.20 | 0.25 | 0.40 | 0.50 | 0.75 | 1.00 | 1.50 | 2.00 | 4.00 | 5.00 |
| Diatomaceous Earth (>90%) | | | | | 111 | 113 | 132 | | | | |
| Diatomaceous Earth[1] | | 133 | | 130 | 127 | 128 | 142 | 156 | 166 | 154 | 148 |
| Fullers Earth[2] | | | 119 | | 126 | 126 | 138 | 143 | 168 | 134 | 139 |
| Na Bentonite | | | | | 137 | 137 | 129 | | 138 | | 146 |
| Na Bentonite (50%)/Fullers Earth[2] (50%) | | | | | | | 113 | | 113 | | 133 |
| Ca Bentonite[3] | | 113 | | 113 | 131 | 119 | 124 | | 120 | | |

TABLE 1-continued

| Additive | Wt % in Urea | | | | | | | | | | |
|---|---|---|---|---|---|---|---|---|---|---|---|
| | 0.10 | 0.20 | 0.25 | 0.40 | 0.50 | 0.75 | 1.00 | 1.50 | 2.00 | 4.00 | 5.00 |
| Ca Bentonite[3] (75%)/DE[1] (25%) | | | | | | | 128 | | | | |
| Ca Bentonite[3] (50%)/DE[1] (50%) | | | | | | | 128 | | | | |
| Ca Bentonite[3] (25%)/DE[1] (75%) | | | | | | | 124 | | | | |
| Zeolite | | | | | 119 | | 114 | | | | |
| Kaolin | | | | | 125 | 126 | 131 | | | | |
| Ball Clay | | | | | 117 | 117 | 124 | | | | |

[1]Approx 63% DE/37% clay
[2]Approx 50% DE/50% clay
[3]Low to moderate swelling

From the data in Table 1, it is apparent that the samples containing the finely divided mineral fillers in accordance with the present invention yielded crushing strengths (hardness) far better than that attained with untreated urea and substantially equal to the crushing strengths achieved with the gelling type clays disclosed in Elrod '021. In practice, it has been found that the preferred addition levels of mineral fillers is in the range of 0.1 to 5.0 % by weight of the admixture, with the most preferred range being 0.5 to 2.0% by weight.

The results in Table 1 are surprising in that the suitable mineral fillers exhibit a microstructure different to that of the gelling type channelized 2:1 clay which Elrod '021 taught as being likely responsible for the enhanced anticaking and non-friable characteristics. This discovery is also surprising in that clays and diatomaceous earth that have been used in the prior art to surface treat urea particles were not considered in Elrod '021 as being suitable for incorporation into the urea synthesis liquor.

Diatomaceous earth is often found in deposits mixed with substantial quantities of other minerals such as clay. It has been found that such mixtures of diatomaceous earth and clay or other minerals are effective to improve the hardness of urea granules. This finding permits the use of diatomaceous earth deposits that have appreciable quantities of clay or mineral impurities as a source for the diatomaceous earth additive for use in the present invention.

In addition, clay deposits often include mineral impurities such as, for example, quartz, cristobalite and muscovite. It has been found that the inclusion of significant quantities of mineral impurities in the clays of this invention does not detract from their ability to improve the hardness of urea granules.

Numerous modifications, variations and adaptations may be made to the particular embodiments of the invention described above without departing from the scope of the invention, which is defined in the claims.

We claim:

1. A particulate urea having improved anticaking, hardness and nonfriable properties, said particulate urea being transformed into particulate form from an admixture of urea and an effective amount of a finely divided mineral filler homogeneously distributed therein, said mineral filler consisting of one or more members selected from the group consisting of diatomaceous earth, sodium bentonite, calcium bentonite, kaolin, zeolite and ball clay.

2. The particulate urea of claim 1 wherein said mineral filler is present in the range from about 0.1% to about 5.0% by weight of said admixture.

3. The particulate urea of claim 1 wherein said mineral filler is present in the range of about 0.5% to about 2.0% by weight of said admixture.

4. The particulate urea of claim 2 wherein said mineral filler is diatomaceous earth.

5. The particulate urea of claim 3 wherein said mineral filler is diatomaceous earth.

6. The particulate urea of claim 2 wherein said mineral filler is sodium bentonite.

7. The particulate urea of claim 3 wherein said mineral filler is sodium bentonite.

8. The particulate urea of claim 2 wherein said mineral filler is calcium bentonite.

9. The particulate urea of claim 3 wherein said mineral filler is calcium bentonite.

10. The particulate urea of claim 2 wherein said mineral filler is kaolin.

11. The particulate urea of claim 3 wherein said mineral filler is kaolin.

12. The particulate urea of claim 2 wherein said mineral filler is zeolite.

13. The particulate urea of claim 3 wherein said mineral filler is zeolite.

14. The particulate urea of claim 2 wherein said mineral filler is ball clay.

15. The particulate urea of claim 3 wherein said mineral filler is ball clay.

16. A particulate urea having improved anticaking, hardness and nonfriable properties, said particulate urea being transformed into particulate from from an admixture of urea and an effective amount of a finely divided mineral filler homogeneously distributed therein, said mineral filler consisting essentially of a mixture of diatomaceous earth and one or more clays selected from the group consisting of sodium bentonite, calcium bentonite, kaolin, zeolite and ball clay.

17. The particulate urea of claim 16 wherein said mineral filler is present in the range from about 0.1% to about 5.0% by weight of said admixture.

18. The particulate urea of claim 16 wherein said mineral filler is present in the range from about 0.5% to about 2.0% by weight of said admixture.

19. A method for producing a particulate urea having improved anticaking, hardness and nonfriable properties comprising the steps of:

incorporating an effective amount of a finely divided mineral filler with a molten urea melt or a urea synthesis liquor, so as to form a homogeneous distribution, said mineral filler selected from the group consisting of diatomaceous earth, sodium bentonite, calcium bentonite, kaolin, zeolite and ball clay and mixtures thereof; and transforming said homogeneous distribution into a particulate form.

20. The method of claim 19 wherein said mineral filler is present in the range from about 0.1% to about 5.0% weight of said particulate urea.

21. The method of claim 19 wherein said mineral filler is present in the range from about 0.5% to about 2.0% by weight of said particulate urea.

22. The method of claim 20 wherein said mineral filler is diatomaceous earth.

23. The method of claim 21 wherein said mineral filler is diatomaceous earth.

24. The method of claim 20 wherein said mineral filler is sodium bentonite.

25. The method of claim 21 wherein said mineral filler is sodium bentonite.

26. The method of claim 20 wherein said mineral filler is calcium bentonite.

27. The method of claim 21 wherein said mineral filler is calcium bentonite.

28. The method of claim 20 wherein said mineral filler is kaolin.

29. The method of claim 21 wherein said mineral is kaolin.

30. The method of claim 20 wherein said mineral filler is zeolite.

31. The method of claim 21 wherein said mineral filler is zeolite.

32. The method of claim 20 wherein said mineral filler is ball clay.

33. The method of claim 21 wherein said mineral filler is ball clay.

34. A method for producing a particulate urea having improved anticaking, hardness and nonfriable properties comprising the steps of:

incorporating an effective amount of a finely divided mineral filler with a molten urea melt or a urea synthesis liquor, so as to form a homogeneous distribution, said mineral filler consisting essentially of a mixture of diatomaceous earth and one or more clays selected from the group consisting of sodium bentonite, calcium bentonite, kaolin, zeolite and ball clay; and transforming said homogeneous distribution into particulate form.

35. The method of claim 34 wherein said mineral filler is present in the range from about 0.1% to about 5.0% by weight of said particulate urea.

36. The method of claim 34 wherein said mineral filler is present in the range from about 0.5% to about 2.0% by weight of said particulate urea.

* * * * *

UNITED STATES PATENT AND TRADEMARK OFFICE
CERTIFICATE OF CORRECTION

PATENT NO. : 5,676,729
DATED : October 14, 1997
INVENTOR(S) : Jim L. Elrod and Peter B. Aylen It is certified that error appears in the above-indentified patent and that said Letters Patent is hereby corrected as shown below:

Claim 16

Column 6, Line 41  delete first "from";

Signed and Sealed this

Twenty-third Day of December, 1997

Attest:

BRUCE LEHMAN

*Attesting Officer*

*Commissioner of Patents and Trademarks*